US012288626B2

(12) United States Patent
Van Dyk et al.

(10) Patent No.: US 12,288,626 B2
(45) Date of Patent: Apr. 29, 2025

(54) METHOD AND COMPOSITION FOR LIMITING PERMEABILITY OF A MATRIX TO LIMIT LIQUID AND GAS INFLOW (71) Applicants: Relborgn Pty Ltd, Bibra Lake (AU); Triomviri Pty Ltd, Bibra Lake (AU)

(72) Inventors: Deon Van Dyk, Perth (AU); Nico Johan Grobler, Kensington (AU)

(73) Assignees: Relborn Party Ltd, Bibra Lake (AU); Triomviri Party Ltd, Bibra Lake (AU)

( * ) Notice: Subject to any disclaimer, the term of this patent is extended or adjusted under 35 U.S.C. 154(b) by 1269 days.

(21) Appl. No.: 16/978,205

(22) PCT Filed: Mar. 5, 2018

(86) PCT No.: PCT/AU2018/050198
§ 371 (c)(1),
(2) Date: Sep. 4, 2020

(87) PCT Pub. No.: WO2019/169423
PCT Pub. Date: Sep. 12, 2019

(65) Prior Publication Data
US 2021/0043335 A1   Feb. 11, 2021

(51) Int. Cl.
*G21F 9/24* (2006.01)
*C08J 9/36* (2006.01)
*C09D 5/02* (2006.01)
*C09D 7/61* (2018.01)
*E02D 31/02* (2006.01)
*E02D 31/10* (2006.01)
*E21D 9/00* (2006.01)
*E21D 11/38* (2006.01)

(52) U.S. Cl.
CPC .............. *G21F 9/24* (2013.01); *C08J 9/365* (2013.01); *C09D 5/022* (2013.01); *C09D 7/61* (2018.01); *E02D 31/02* (2013.01); *E02D 31/10* (2013.01); *E21D 9/002* (2013.01); *E21D 11/38* (2013.01)

(58) Field of Classification Search
CPC ... G21F 9/24; C09D 7/61; C09D 5/022; C08J 9/365; E02D 31/02; E02D 31/10; E21D 9/002; E21D 11/38
USPC .......................................................... 588/16
See application file for complete search history.

(56) References Cited

U.S. PATENT DOCUMENTS

| | | |
|---|---|---|
| 2,610,158 A | 9/1952 | Hall |
| 2,829,502 A | 4/1958 | Dempsey |
| 3,296,919 A | 1/1967 | Williams |
| 3,521,454 A | 7/1970 | Dodds |
| 3,606,357 A | 9/1971 | Yonkers |
| 3,727,412 A | 4/1973 | Marx et al. |
| 3,730,271 A | 5/1973 | Gall |
| 3,761,455 A | 9/1973 | Tanaka et al. |
| 4,177,999 A | 12/1979 | Raber |
| 4,280,390 A | 7/1981 | Murray |
| 4,296,932 A | 10/1981 | Grobler |
| 4,642,964 A | 2/1987 | Kellison |
| 5,401,122 A | 3/1995 | Pate |
| 5,653,078 A | 8/1997 | Kies |
| 5,961,437 A | 10/1999 | Smith |
| 6,177,483 B1 | 1/2001 | Tehrani et al. |
| 6,244,807 B1 | 6/2001 | Garcia |
| 6,258,757 B1 | 7/2001 | Sweatman et al. |
| 6,419,017 B1 | 7/2002 | Metcalf et al. |
| 6,608,131 B1 | 8/2003 | Winterowd et al. |
| 6,801,814 B1 | 10/2004 | Wilson et al. |
| 8,382,808 B2 | 2/2013 | Wilberg |
| 8,475,103 B2 | 7/2013 | Michalski |
| 10,309,220 B2 | 6/2019 | Van Dyk |
| 2002/0160919 A1 | 10/2002 | Calvin et al. |
| 2003/0099153 A1 | 5/2003 | Renfro |
| 2005/0269080 A1 | 12/2005 | Cowan |
| 2006/0122071 A1 | 6/2006 | Reddy et al. |
| 2006/0219405 A1 | 10/2006 | Nguyen et al. |

(Continued)

FOREIGN PATENT DOCUMENTS

AU  534073 B2  1/1984
AU  9724775  11/1997

(Continued)

OTHER PUBLICATIONS

Ajalloeian et al, Evaluation of hydrojacking and hydroracturing behaviour in Aghajari formation; Gotvand dam site foundation, Iran, Journal of Geology and Mining Research, 2011, vol. 3, No. 3, 46-53.

(Continued)

Primary Examiner — Edward M Johnson
(74) Attorney, Agent, or Firm — Ballard Spahr LLP (57) ABSTRACT A method of limiting or reducing liquid and/or gas inflow through a porous matrix, comprising delivering to said porous matrix a coagulable polymer emulsion or colloid for contacting with at least one selected additive which interacts with said polymer emulsion or colloid to form a sealing barrier to reduce liquid and/or gas inflow through the porous matrix wherein said coagulable polymer emulsion or colloid contains at least one selected additive including one or a combination of radiation stabilisers to confer radiation resistance; and wherein said sealing barrier is formed by contacting said polymer emulsion or colloid with a further selected additive to cause coagulation of said polymer emulsion or colloid to form said sealing barrier. The sealing composition, which has low toxicity, preferably contains carbon black as radiation stabiliser conferring radiation resistance for the sealing barrier in the range 1 to 100 MRad.

11 Claims, 5 Drawing Sheets

(56) References Cited

U.S. PATENT DOCUMENTS

| | | |
|---|---|---|
| 2006/0234871 A1 | 10/2006 | Dalrymple et al. |
| 2007/0111901 A1 | 5/2007 | Reddy et al. |
| 2007/0287639 A1 | 12/2007 | Reddy et al. |
| 2008/0087423 A1 | 4/2008 | Wylie et al. |
| 2008/0096774 A1 | 4/2008 | Tabary et al. |
| 2008/0269390 A1 | 10/2008 | Weitzel |
| 2009/0137431 A1 | 5/2009 | Reddy et al. |
| 2011/0115166 A1 | 5/2011 | Grobler et al. |
| 2011/0272142 A1 | 11/2011 | Lewis et al. |
| 2012/0061083 A1 | 3/2012 | Ballard |
| 2015/0114109 A1 | 4/2015 | Wech |
| 2015/0167269 A1 | 6/2015 | Van Dyk et al. |

FOREIGN PATENT DOCUMENTS

| | | |
|---|---|---|
| AU | 739427 B2 | 10/2001 |
| AU | 2017100604 | 7/2017 |
| CN | 1063474 | 3/2001 |
| EP | 0037717 B1 | 6/1984 |
| FR | 2874617 | 3/2006 |
| JP | H0317308 | 1/1991 |
| JP | H03147919 | 6/1991 |
| JP | H08120181 | 5/1996 |
| JP | H1094770 | 4/1998 |
| JP | 2000272022 A | 10/2000 |
| JP | 2004251010 A | 9/2004 |
| WO | 200041480 A2 | 7/2000 |
| WO | 0194742 A1 | 12/2001 |
| WO | 2008045417 A2 | 4/2008 |
| WO | 2009146493 A1 | 12/2009 |
| WO | 2015148793 A1 | 10/2015 |

OTHER PUBLICATIONS

Sadhan and White, 2.8.1 Preservation and Concentration of Latex, Rubber Technologist's Handbook, Natural Rubber, 2001, pp. 19 and 20.

NMV Kalyani Liyanage, Colloidal Stability of Natural Rubber Latex; Bulletin of the Rubber Research Institute of Sri Lana: (1999); 40, 9-16.

R.S. Barrows; Stability of High Polymer Latexes to Acidification; Industrial and Engineering Chemistry; (1948); vol. 40, No. 11; pp. 2193-2196.

Cabot, "Speciality Carbon Blacks and Fumed Silicas for Oil and Gas Applications", retrieved from the Internet on Aug. 27, 2020, URL, http://www.cabotcorp.com/~/media/files/brochures/specialty_carbon-blacks/brochure-specialty-carbon-blacks-fumed-silicas-for-oil-gas-applications.pdf.

Ananthakrishnan, Ravi, International Written Opinion for International application No. PCT/AU2018/050198, May 1, 2018, pp. 1-6, Australian Patent Office, Australia.

Ananthakrishnan, Ravi, International Written Opinion for International application No. PCT/AU2018/050198, May 1, 2018, pp. 1-4, Australian Patent Office, Australia.

METHOD AND COMPOSITION FOR LIMITING PERMEABILITY OF A MATRIX TO LIMIT LIQUID AND GAS INFLOW

CROSS REFERENCE TO RELATED APPLICATIONS

This is a U.S. National Phase Application of International Application No. PCT/AU2018/050198, filed Mar. 5, 2018, entitled "Method and Composition for Limiting Permeability of a Matrix to Limit Liquid and Gas Inflow" the contents of which is incorporated herein in its entirety.

FIELD OF THE INVENTION

The present invention relates to a method and composition for limiting or reducing permeability of a matrix to liquid or gas flow, including limiting inflow into passages such as cavities, fissures, voids, open features and pore spaces encountered in formations such as geological formations as well as at other sites such as civil construction sites and locations where permeability must be reduced or avoided. The method and composition are particularly suitable for application, as containment barriers, at sites subject to radioactive contamination or ionising radiation.

BACKGROUND TO THE INVENTION

Methods of attempting to substantially seal or otherwise reduce the permeability of a matrix such as concrete, rock or soil are known. For example, regular cement based suspension grouts can be introduced into voids, opens spaces and pore spaces around a mine shaft in order to attempt to seal fissures or reduce the permeability of unconsolidated sand or soil around the shaft, thereby limiting liquid inflow into the shaft.

Typically, a volume of grout or sealing composition product is transported to the site to be treated and applied to the passage or passages requiring sealing to prevent water inflow. Application typically involves pumping of grout to the passage or passages. Sealing composition which is generally premixed prior to delivery of the site often provides less than satisfactory results in terms of preventing or reducing water inflow. For example, injection or introduction of a cement based grout, known to have suitable properties in sealing passages, can cause hydrofracturing if applied to an unconsolidated matrix such as sand or sandstone. This can create seams of grout within the matrix, leaving sections of unconsolidated matrix on either side of the created seams. Such an application has minimal impact on reducing the ability for water to pass through the matrix and hence into a shaft that has been sunk through the matrix.

There is also difficulty in use of premixed grouts in that setting time cannot be controlled or varied either at all or with any reliable degree of accuracy. This is detrimental in that known premixed grouts are generally capable only of providing a "one size fits all" sealing solution. Since there is such a wide range of conditions that can be experienced when seeking to limit permeability of a matrix so as to limit liquid inflow, a 'one size' approach to all types of inflow problems is inherently unsuitable.

Traditional and pre-mixed cement and bitumen based grouts can additionally fail to adequately penetrate the passage or passages to be sealed. At least part of this failure can be attributed to the sealing composition simply failing to penetrate through the matrix to a required depth. Rate of setting of the sealing composition can also affect whether or not the sealing composition is able to adequately prevent or practically reduce water inflow.

For example, it is desirable when applying a grout to reduce permeability in a sand formation, that the grout can be able to permeate a suitable distance through the formation prior to setting. If setting occurs prematurely, the grout is unable to adequately penetrate the matrix and create sufficient adhesion of particles in the matrix to form an effective seal to water inflow.

The Applicant has developed latex based sealing compositions successfully used in a range of sealing applications, from mining applications through to civil engineering applications such as the repair of tunnels or the formation of containment barriers about spills or structures which may include waste storage facilities.

The Applicant's Australian Patent No. 739427 hereby incorporated herein by reference discloses a method of sealing a passage in a body such as a geological formation with a seal composition comprising delivering under pressure into the passage an admixture of latex and one or more of the following components: a friction resistant material, an extreme pressure additive; and a plasticiser, these components in total being present in quantities not greater than about 1% by weight of the mixture. The components may typically include organic and/or inorganic origin viscosity enhancing materials, detergents and/or soap.

The Applicant's Australian Patent No. 2009253842 hereby incorporated herein by reference discloses a method of sealing a passage in a body with a sealing composition comprising (a) a major proportion of a latex emulsion or colloid; and (b) a minor proportion of lauric acid or laurate compound; and (c) at least one further selected additive, ideally a latex coagulation inhibitor, wherein the sealing composition is pumped into the passage where it is set or coagulated to form a sealing barrier.

The Applicant's Australian Patent No. 2013266018 hereby incorporated herein by reference discloses a method of limiting or reducing permeability of a matrix to liquid or gas flow including the steps of measuring one or more parameters relating to the matrix and selecting one or more components of a multi-component sealing composition with reference to the measured parameters.

In addition, potential sealing applications may expose sealing compositions to ionising radiation as well. A sealing composition, particularly if of polymeric nature, is likely to be subject to radiation degradation. Whatever the nature of the radiation, the process of degradation is in the nature of a chain reaction involving steps of chain initiation, chain propagation, chain branching and chain termination. Cross linking exemplifies this sequence of events.

It is therefore an object of the present invention to provide a sealing method and composition for limiting or reducing permeability of a matrix to limit or reduce liquid and/or gas flow, including limiting or reducing gas and/or liquid flow within a passage in the matrix that can be applied at sites subject to radiation by ionising radiation including radiation present in nuclear installations whether or not in operation.

SUMMARY OF THE INVENTION

According to a first aspect of the present invention there is provided a method of limiting or reducing liquid and/or gas flow through a porous matrix, comprising delivering to said porous matrix a coagulable polymer emulsion or colloid for contacting with at least one selected additive which interacts with said polymer emulsion or colloid to form a sealing barrier to reduce liquid and/or gas inflow through the porous matrix wherein said coagulable polymer emulsion or colloid contains at least one selected additive including one or a combination of radiation stabilisers (also known as anti-rad compounds) to confer radiation resistance and wherein said sealing barrier is formed by contacting said polymer emulsion or colloid with a further selected additive to cause coagulation of said polymer emulsion or colloid to form said sealing barrier. Radiation stabilisers include compounds that confer resistance to ionising radiation on the sealing barrier should this be required. A porous matrix is a matrix through which liquids and/or gases could flow whether through cavities, fissures, faults, passages, pores or other voids. The method can usefully be applied to prevention of leaks or seepage of liquids as well as purposeful containment of liquids such as contaminated groundwater or yellowcake processing waste or liquid radioactive waste generally. For solid waste, run-off of contaminated water and other liquids may also be an issue. The sealing method can also provide a sealing barrier to minimise risks of environmental release of such polluted liquids.

In another embodiment, the present invention provides a sealing composition or colloid contactable with at least one selected additive which interacts with said polymer emulsion or colloid to form a coagulated mass for forming a sealing barrier against liquid and/or gas inflow through a porous matrix, wherein said polymer emulsion or colloid contains at least one selected additive including one or a combination of radiation stabilisers (also known as anti-rad compounds) to confer radiation resistance. It is to be understood that the sealing composition is not typically intended to form a radiation barrier or shield as such. Rather, the sealing composition is intended to form an effective sealing or containment barrier against liquid and/or gas inflow through a porous matrix even at high radiation levels as described further below.

In a preferred embodiment of the present invention, the polymer based component or grout component is latex based such as a latex emulsion, colloid or aqueous dispersion. Natural latex is preferred, preferably a natural latex of purity 20 wt % to 60 wt %. Desirably, the grout component is aqueous to permit ready mixing with a further additive in the form of a curing agent which is required for coagulation or setting of a latex based sealing composition to form the barrier seal. Advantageously and desirably, the polymer emulsion or colloid, including in the preferred form of natural latex based emulsion or colloid, has a size distribution smaller than for Portland Cement, typically having 98 wt % or more particles having size distribution lying between 5 and 30 microns.

The radiation stabilisers may, for example, include one or a combination of additives selected from the group consisting of carbon black, zinc oxide both in particulate form and essentially insoluble in water; ortho di-substituted phenols, hydroxyphenyl propionates (such as supplied under the brand Irganox® from BASF AG), hydroxybenzyl compounds, aromatic amines, sterically hindered amines, phosphites and organic sulphur compounds such as thiobisphenols and thioethers. The compound is one selected to prevent or inhibit excessive cross-linking and radiation degradation. Preferably, the compound is selected for suitability for the containment application, compatibility with latex as well as cost and the transport properties to the sealing site.

Carbon black is a preferred additive, preferably being present in the latex in proportion of 0.1 to 3 wt %, more preferably less than 1 wt %, for example in the range 0.5 to 0.7 wt %. Carbon black may be available as a furnace black or a special black. Furnace blacks are a relatively low cost commodity chemical typically produced from heating heavy residual oil in the absence of oxygen.

The sealing barrier is advantageously resistant to ionising radiation in dosage greater than 1 MRad, preferably greater than 10 MRad and desirably up to 100 MRad dependent on the anti-rad used, a dosage that may be encountered at nuclear installations whether or not in operation. By "resistant" is intended that the barrier seal remains effective, having dimensional stability and mechanical properties (such as measured by elastic modulus, Youngs Modulus, tensile strength and Poisson Ratio for example) sufficient to prevent failure under the conditions set by the sealing application. Such properties may, however, deteriorate in relative terms, the higher the radiation dosage. Where carbon black is used as anti-rad, acceptable mechanical resistance and effectiveness as a barrier seal is currently expected by the Applicant up to around 100 MRad.

Further additives, or components may include coagulation or setting inhibitors to prevent setting of the composition and promote flow into and permeation of the site to be treated during transport and prior to initiation of setting to form the barrier. The preferably small particle size distribution of the polymer emulsion or colloid and any additives assists with flow and permeation into the matrix to be treated including very small cracks that might not even be subject to water leakage prior to sealing of larger cracks or voids, providing a significant advantage over cement which, with larger particle size and higher viscosity is generally limited to sealing cracks having dimension above about 160 microns. Non-limiting examples of inhibitor additives are surfactants, such as cationic surfactants. Surfactants can prevent flocculation of latex upon introduction into passages within a porous matrix. At sites where water present in the passage has high salt concentrations, that is, the water is substantially brine, water present at the sealing location should be treated with an inhibitor additive to prevent early coagulation or setting of the surface composition in the passage.

The further additive may, as alluded to above, also include a coagulation activator or curing agent, or a mixture of these, to initiate or promote setting. Non-limiting examples of these additives are alkaline compounds (such as KOH or $NH_4OH$); plasticisers, carboxylic acids, borates, silicates, hydroxides as well as metal salts thereof. Further additives include water reducers and fluidifiers. Such activators desirably initiate a non-exothermic setting process avoiding disadvantages to heat release such as reduced safety and damage at or around the barrier. It may be more convenient to have the ability to introduce a single composition into the passage whilst still desirably maintaining ability to vary or control the setting time of the composition in response to particular parameters or variables present at the site of application. In this case, the further selected additive conveniently includes a curing agent and the combined polymer emulsion or colloid and curing agent are introduced into the passage where it is set or coagulated to form a seal. Rate of curing or setting of polymer emulsion or colloid, i.e the grout component, may then be controlled or varied by modifying the ratio of grout component to curing agent. Particle density and size of particles within the emulsion or colloid may also be modified to vary curing rate or setting time. If particles have small size, a greater surface area is also generated, this affecting the flocculation/coagulation rate. The curing agent may be selected from the group consisting of agents that have the effect of lowering of the pH of the liquid; and oxidising agents such as permanganate and chromium trioxide. Other potential curing agents are described in the Applicant's Australian Patent No. 2013266018, incorporated herein by reference. Curing may be induced, in some instances, by selected equipment, for example being capable of irradiating and cross-linking the grout component.

The sealing composition desirably has low toxicity and desirably passes regulatory limits for metals such as arsenic, cadmium, chromium, lead, mercury, selenium and silver and regulated VOC, SVOC or commonly used organochlorine pesticides as set down for example by the US Environmental Protection Agency, SW-846, Method 1311 Toxicity Characteristic Leaching Procedure, the contents of which are hereby incorporated herein by reference.

The present method is particularly applicable in any situation where it is desired to prevent or reduce liquid or gas inflow in a manner resistant to radiation degradation, such as building structures including nuclear installations whether or not in operation (for example to form a containment barrier around and/or beneath radioactive waste storage tanks), underground excavations, waste disposal sites and foundations. The present method is particularly suitable to limiting or reducing water or gas inflow in geological formations, for example surrounding mine shafts and other similar passages, as well as structures (such as radioactive waste storage facilities) subject to radiation contamination. Barriers may be formed in soil, including sandy soils and sands, with the sealing composition forming an aggregate with the soil. Barriers may be formed prior to, or following, construction of structures, conveniently by curtain grouting technique.

The present method desirably includes, prior to delivery of the components of the sealing composition, measurement and analysis of parameters that are specific to the site that is to be treated and substantially at the time of site treatment. Preferably, the method includes measuring qualities of liquid, usually water, present within or flowing through the passage(s) to be sealed as the method is particularly advantageous in cases where flowing water is present. Liquid present within the matrix is ideally collected and analysed to determine properties such as pH, temperature, mineral content and salinity. Selection and concentration of components of the sealing composition, such as additives and inhibitors are then determined with reference to these site specific measurements in order to control the set time of the composition in the passage. Hydraulic and/or pneumatic parameters are advantageously measured and analysed to enable appropriate sealing composition selection as well as an estimate of volume of sealing composition required for sealing. Further description of the procedures is provided in the Applicant's Australian Patent No. 2009253842, the contents of which are hereby incorporated herein by reference.

Once hydraulic and/or pneumatic parameters are determined, the matrix is drilled to provide injection ports and associated bores or injection holes through which sealing composition is directed into the matrix, conveniently by a curtain grouting technique. A plurality of injection ports and bores would typically be drilled and used, the locations being selected to enable a barrier or curtain of radiation resistant sealing composition to be formed around a required volume of the matrix. The barrier may be formed to define a volume of desired shape, for example of rectilinear, cylindrical or conical shape, with a plurality of injection ports arranged as a circular array. If the containment barrier is to be conical, the injection holes communicating with the injection ports would be drilled at an angle to intersect and form the conical barrier allowing for spread of the sealing composition. If the containment barrier is to be cylindrical, the injection holes are most conveniently drilled so as not to intersect. The injection holes are spaced and/or sized so that sealing composition is distributed to form the required barrier. For high radiation level sites, drilling of injection holes should involve push drilling using push rods to avoid return of cuttings or fines to the surface. Push drilling may generally be preferred.

In a preferred aspect, the method includes the step of introducing the sealing composition to the required site(s), for example by injection. Components of the sealing composition may be introduced into the site independently such that the sealing composition is effectively composed in situ. That is, the sealing composition may be a multi-component formulation wherein the various components are brought together and react therewith in situ in the matrix. Where the sealing composition is formulated with suitable radiation stabiliser, for example carbon black, resistance to ionising radiation can also be achieved.

In a preferred aspect, the method includes the step of introducing the polymer emulsion and additive mixture to the porous matrix by injection, possibly at very high pressure though injection pressures of less than 1 MPa may be acceptable for civil structural applications and injection into soils of various types. Hard rock application may require significantly higher pressure, possibly of up to 20 MPa. Desirably, components of the sealing composition are introduced to the matrix by means of a suitable pump, preferably a multi-port pump, whereby the components of the sealing composition are introduced via separate pump holes though desirably well mixed through the injection process. Preferably, the pump is a positive displacement pump such as an air diaphragm pump. Such pumping equipment and the ability to introduce components of the composition separately into the site advantageously enables a degree of control over introduction of the composition to the matrix and hence control of setting time. In particular, it is advantageous that the pump be able to inject the composition into the passage at variable pressures, said pressure variation selected in response to changes in measured site specific hydraulic, pneumatic and chemical parameters. Further description of options for delivering the components of sealing compositions to the porous matrix is provided in the Applicant's Australian Patent No. 2013266018, the contents of which are hereby incorporated herein by reference.

The sealing method and sealing composition may be used in combination with complementary sealing methods and devices not dependent on grouting. Cementation and use of sealing devices in combination with a sealing barrier formed by the method of the invention are examples of such complementary methods. Sealing devices may be shaped to fit cavities where required to form a containment barrier. Such cavities may include process vessels and process piping in nuclear and other ionising radiation applications.

The method is conveniently controlled by a control unit which monitors site parameters, such as those described above, and actuates equipment, such as pumps and valves, to deliver the sealing composition components to pre-determined locations.

DETAILED DESCRIPTION OF PREFERRED EMBODIMENTS

The method and composition of the present invention may be better understood from the following description of preferred embodiments and examples and with reference to the accompanying drawings, in which.

Figure 1:
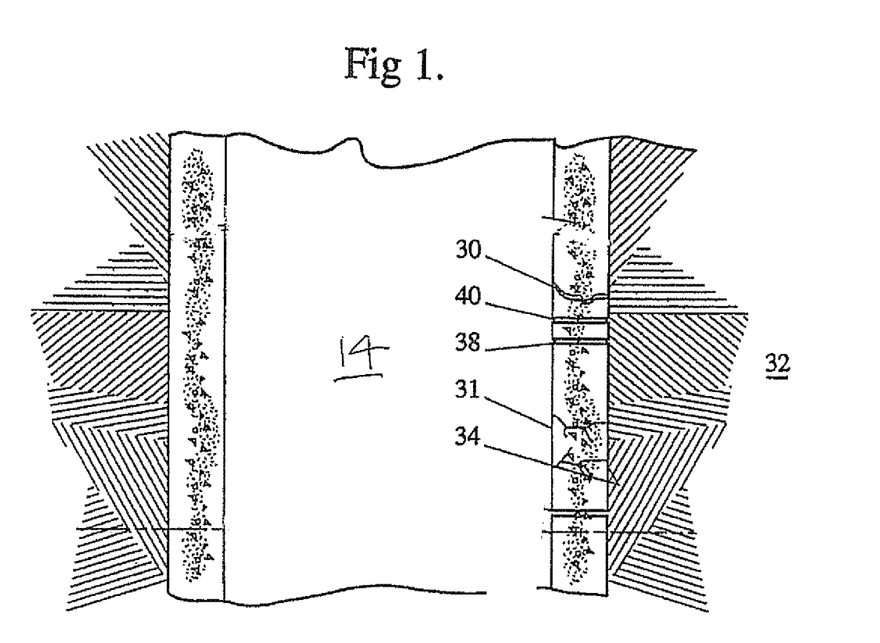
FIG. 1 is a schematic cross-sectional view of a ground formation surrounding a vessel holding liquid radioactive waste having cracks or apertures in the matrix surrounding the vessel that requires sealing in accordance with a first embodiment of the sealing method to prevent or minimise water inflow into the vessel.

Referring to FIG. 1, the sealing method of one embodiment of the invention is applied to treatment of a vessel 14 holding aqueous radioactive waste associated with a nuclear installation located in a porous matrix 32 being a ground formation surrounding a vessel 14, through which contaminated water penetrates through cracks 30 in the wall 31 of vessel 14, and face 34, the cracked wall 31 also forming a porous matrix requiring sealing to prevent outflow of contaminated water into the surrounding ground formation 32.

Hydraulic parameters of the porous matrix 32 must also be determined. The nature and extent of the hydraulic field in the porous matrix 32 beyond vessel 14 must be understood if effective sealing is to be effected. In order to determine hydraulic parameters of connectivity, penetration and spread of water inflow, a suitable dye, such as a tracer dye, having the same flow characteristics as water but being coloured so as to clearly contrast against the vessel 14 and the site, is introduced through suitable injection holes (not shown). Seepage of the dye outward from the vessel 14 and through the porous matrix 32 can be timed and visually assessed to determine permeation of water outflow as well as any other water flows through the matrix which may add to a radioactive waste contamination problem. Reporting of dye indicates where water flow is occurring and flow rate of the dye is measured to determine flow properties of the dye within the matrix 32 when introduced at a particular rate and pressure. This gives an indication of the flow rates of a solution of the sealing composition, so that it can be determined when to introduce suitable additives and at what concentrations.

Having reference to parameters ground and water temperature, water pH, mineral content and salinity levels as well as flow properties of water in and around the vessel 14, the porosity of matrix 32 and of temperature of the site, components and the respective concentrations of said components of the sealing composition can be suitably selected as well as the estimated volume of sealing composition needed. Further description of the sealing composition is provided below. One option is to drill passages 38 and 40 through to the vessel 14 so that sealing composition can be introduced to seal the cracks 30 through and form a sealing barrier against flow of contaminated water.

In a further embodiment described with reference to FIGS. 2 to 5, the sealing method could be used for forming containment barriers for restricting liquid or gaseous leakage from a radioactive waste storage facility 110 having a number of tanks 114 for holding liquid radioactive waste and surrounding structure 120 with side walls and floor also constructed of a radiation resistant barrier according to a second containment method as known in the art and, for example, including lead shielding. The waste may be low, medium or high level radioactive waste. Such containment barriers could be constructed 1) during construction of waste storage facility 110, 2) after construction of the waste storage facility, prior to filling of tanks 114 with aqueous radioactive waste, or 3) as a repair strategy for a waste storage facility 110 which has deteriorated over time to provide a barrier seal to protect against possible leaks from the tanks 114 into surrounding ground 150 and porous matrix or formation 170.

The containment barrier 130 may be formed in a number of geometries as described below.

Figure 2:
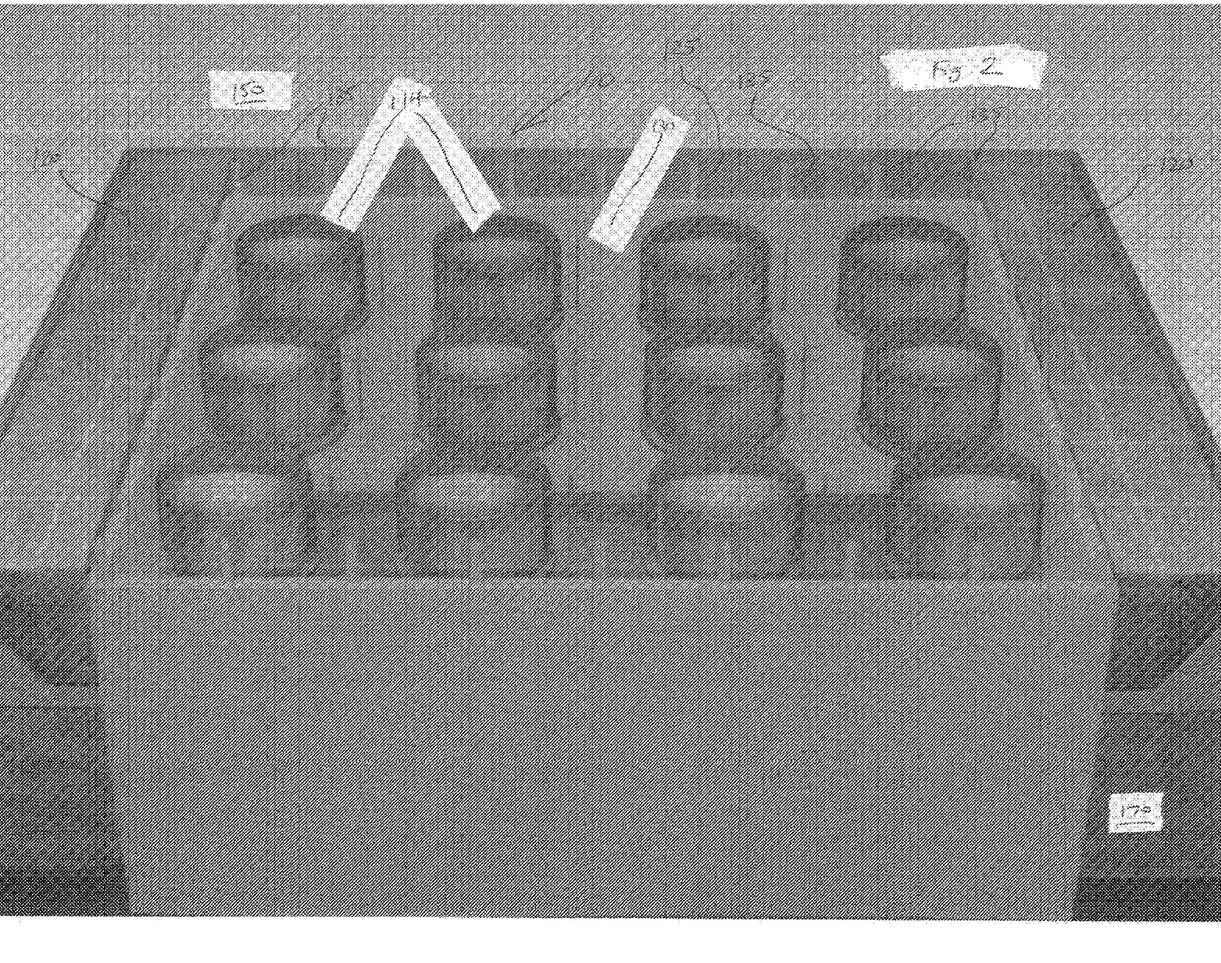
FIG. 2 is a schematic illustration of a radioactive waste storage facility where the sealing method of the invention is applied to form a tank farm containment barrier of a first rectilinear geometry.
Figure 3:
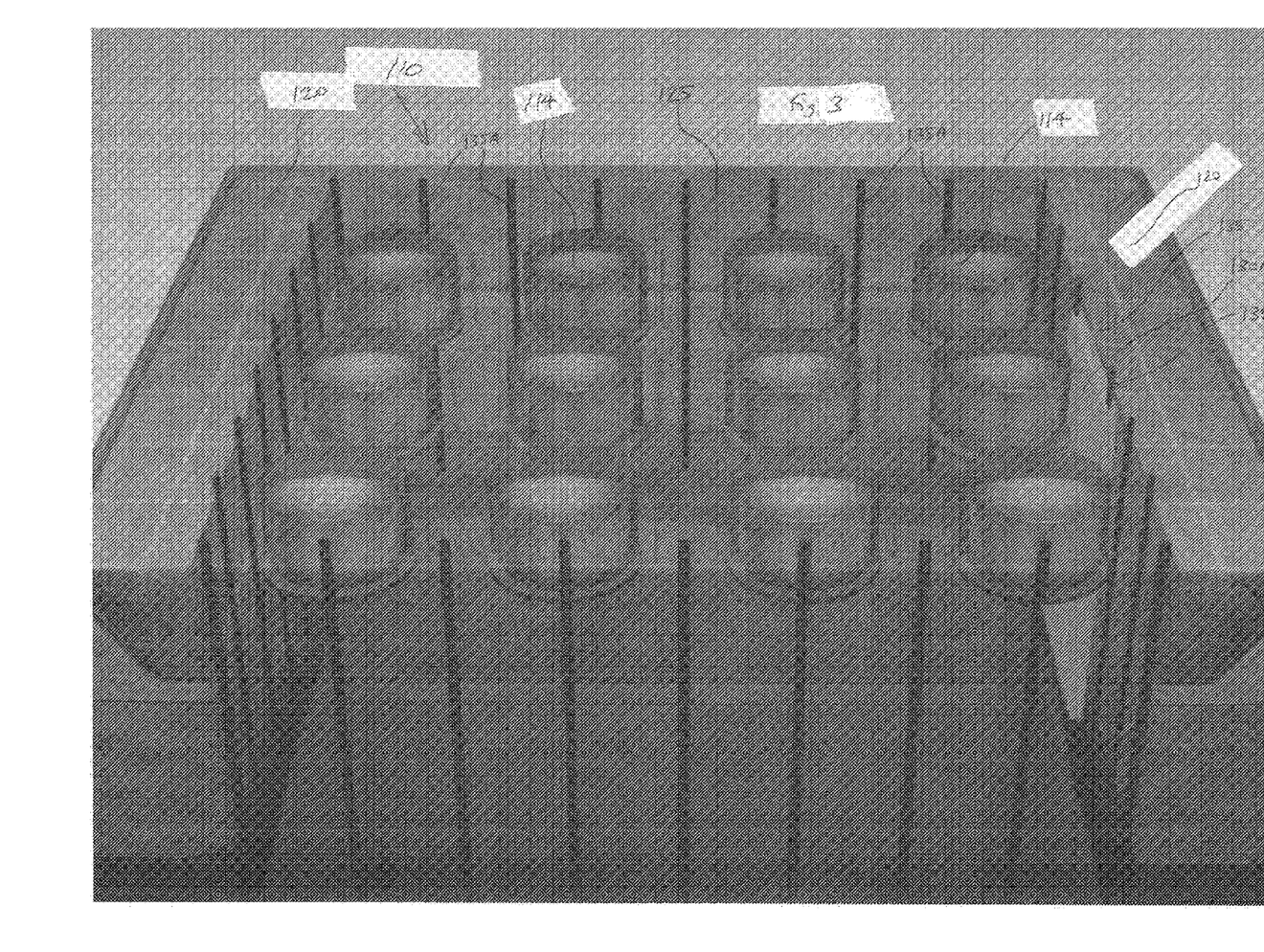
FIG. 3 is a schematic illustration of the radioactive waste storage facility of FIG. 2 showing one section of the tank farm containment barrier of first rectilinear geometry.

Referring to FIGS. 2 and 3, the containment barrier 130 is of rectilinear geometry and arranged within the surrounding containment structure 120 which may be subject to cracking and require sealing treatment. In FIG. 2, injection holes 135 are disposed parallel in a rectangular pattern viewed in plan and sealing composition, as described below, is introduced into the injection holes 135 drilled into sandy overburden 125 surrounding tanks 114 to form, after lateral spreading, a rectangular box shaped containment barrier to prevent waste leakage into surrounding porous matrix or formation 170 and any existing water table as well as surrounding ground 150. FIG. 3 indicates how the rectilinear containment barrier 130 can be constructed in sections, one section 130A of which is shown in FIG. 3. Injection holes 135A have been drilled into sandy overburden 125 but not yet used for grouting to form the containment barrier. One injection hole 135 is shown with grouting for section 130A completed.

A containment barrier may also be required on the floor of the surrounding containment structure 120 of FIGS. 2 and 3. Such a containment barrier may be constructed prior to construction of containment barrier 130. The containment barrier 130 extends to just below the height of surrounding containment structure 120 above surrounding ground 150. Containment barrier 130 extends into surrounding formation 170 a depth calculated with reference to the permeability of the surrounding formation 170 to the radioactive waste. It will be understood that FIGS. 2 and 3 are schematic for ease of illustration. If surrounding formation 170 is fractured or porous, further sealing treatment may be applied to form containment barriers within the surrounding formation as well. Such treatment may, depending on the geology and hydrology of surrounding formation 170, require higher injection pressures than used for forming a containment barrier within the waste treatment facility 110.

Figure 4:
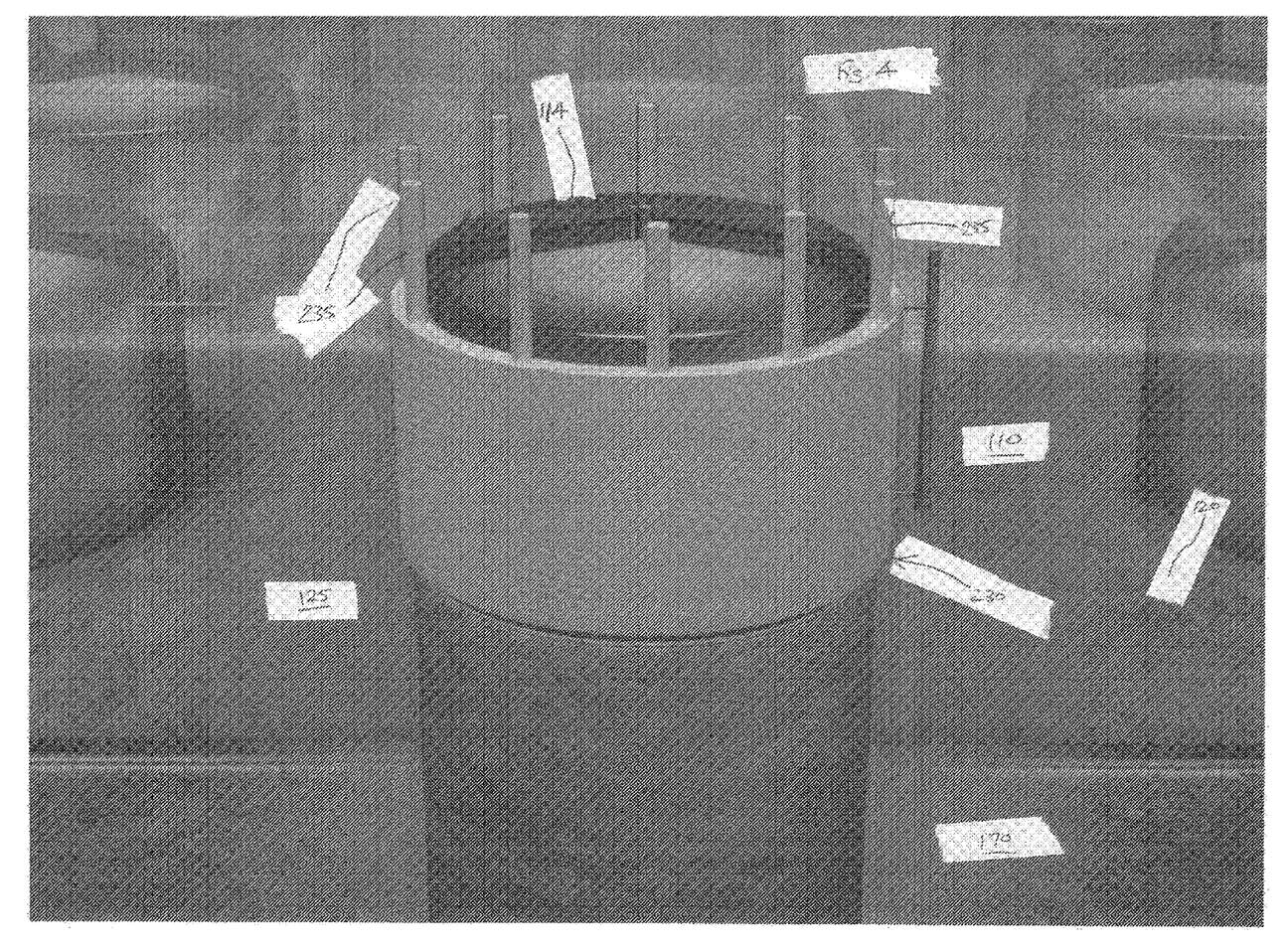
FIG. 4 is a schematic illustration of a radioactive waste storage facility where the sealing method of the invention is applied to form a tank containment barrier of a second cylindrical geometry.

Referring to FIG. 4, an individual tank 114 is provided with a cylindrically shaped containment barrier 230 which is prepared by injecting sealing composition, as described below, through injection holes 235 disposed in a circular array about tank 114. Injection holes 235 drilled through sandy overburden 125 surrounding tank 114 are arranged parallel and injection of sealing composition forms, after lateral spreading, the cylindrically shaped containment barrier to prevent waste leakage into surrounding formation 170 and any existing water table. As with the embodiments of FIGS. 2 and 3, further sealing treatment of the containment structure 120 and surrounding formation 170 may be performed as required.

Figure 5:
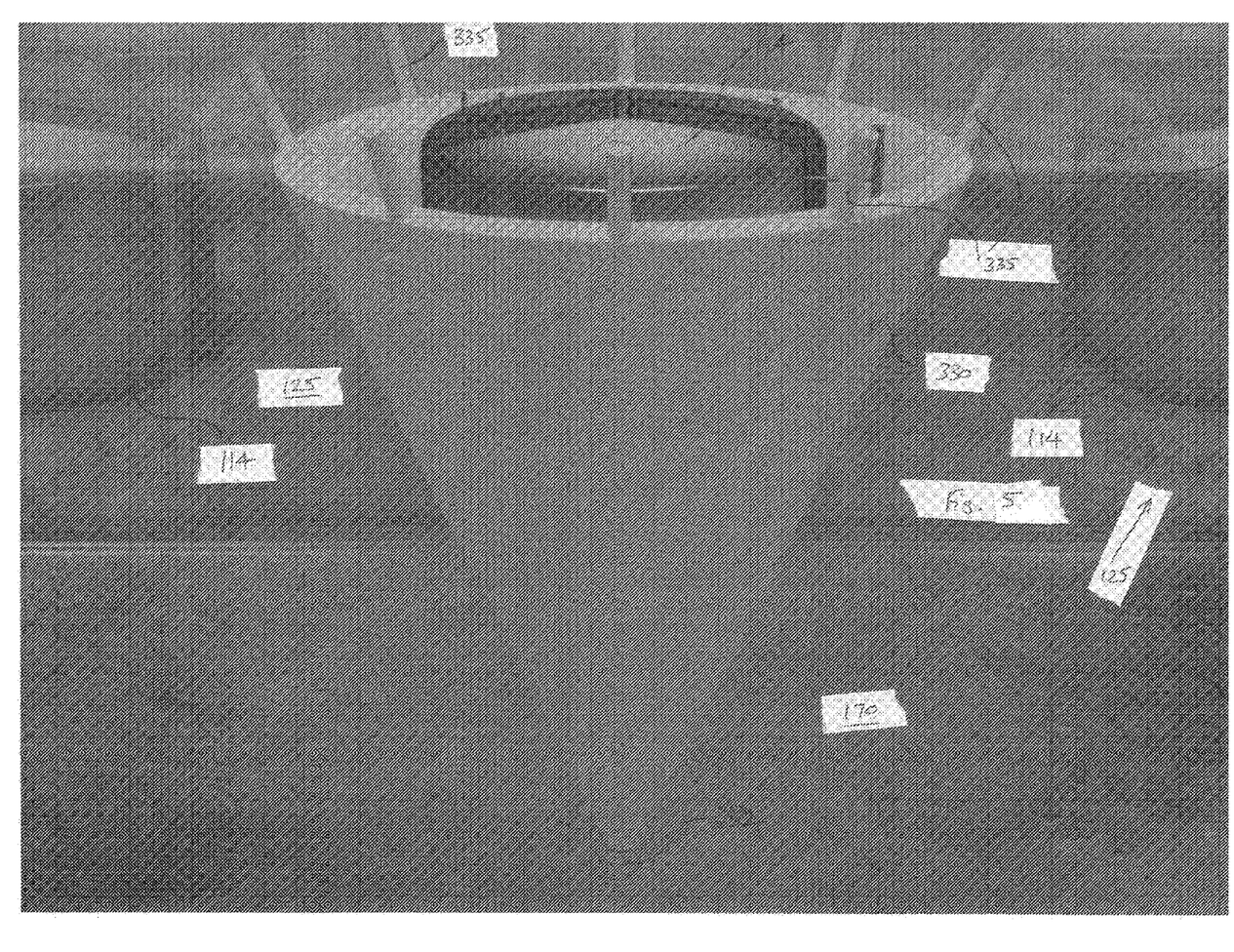
FIG. 5 is a schematic illustration of a radioactive waste storage facility where the sealing method of the invention is applied to form a tank containment barrier of a third conical geometry.

Referring to FIG. 5, containment barrier 330 for a tank 114 has a conical geometry and is constructed for a deteriorating facility where leakage from tank 114 is becoming a risk. Such a containment barrier is formed by drilling injection holes 335 into the surrounding containment structure 120 and surrounding formation 170 at intervals around the tank 114. The hydraulic parameters for the matrix are either determined or known from methods such as those described above. In contrast to the embodiment of FIG. 4, the injection holes 335 are drilled through sandy overburden 125 surrounding tank 114 at an angle, each injection hole 335 converging and intersecting at the apex 332 of the conical containment barrier 330. To reduce cost, while allowing effective sealing, the layout of injection holes 335 should minimise the number of injection holes 335 required. To this end, injection holes 335 are disposed at regular and substantially equidistant intervals in a circular array around tank 114 as indicated by FIG. 5.

As the waste storage facility 110 is a high radiation level site, drilling cuttings or fines cannot be brought to the level of surrounding ground 150. The injection holes 135, 135A, 235, 335 are drilled by push drilling using push rods to prevent cuttings or fines from drilling reaching surface of ground 150. This contrasts with other non-radiation applications where percussive drilling could be used.

During initial phases of introduction of the multi-component composition by injection into the various injection holes 135, 135A, 235, 335, the sealing composition is formulated with an inhibitor to provide an extended set time so as to allow for optimum spread and penetration of sealing composition into matrix 120, 170 specifically to form the containment barriers 130, 230, 330. It is undesirable for the sealing composition to set too close to the injection holes 135, 135A, 235, 335 as this then requires drilling of further injection holes, at a cost, in order to enable introduction of additional sealing composition.

Sealing Composition

The selected grout component of the sealing composition used to form the seal and containment barriers of FIGS. 1 to 5 contains a major proportion of a latex emulsion or colloid, having a near uniform dispersion of polymeric particles desirably having a particle size distribution with 100% of polymer particles having size less than 2 microns. This particle size compares with a particle size range of 5 to 30 microns inorganic cement particles for Portland cement and a Tamcrete® product in which 58% of the inorganic particles have particle size greater than 2 microns and 100% of the inorganic particles have particle size less than 40 microns. The difference in particle sizing is beneficial for the selected latex emulsion based sealing composition since it can flow into and permeate fine cracks at lower pressure and without the risk of undesirable hydro-fracturing that a cement based sealing composition would indicate. A minor proportion of the grout component of the sealing composition was comprised of a lauric acid salt, ammonium laurate, as well as further selected additives as described further below.

By 'major proportion' of latex emulsion or colloid is intended an emulsion or colloid containing sufficient latex to form an effective seal once the emulsion or colloid is in situ within the passages to be sealed (here crack 30) and setting or coagulation is initiated. Typically, latex will be supplied in emulsion or colloidal suspension with water. The preferred latex is a natural rubber latex such as is readily available from a number of sources in various grades. Latex emulsions of purity greater than 20% to 60% and above are preferred for the grout component of the exemplary sealing composition. Further description of the characteristics of suitable latex emulsions is provided in the Applicant's Australian Patent Nos. 2009253842 and 2013266018, the contents of which are incorporated herein by reference.

The radiation stabilisers may, for example, include one or a combination of additives selected from the group consisting of carbon black, zinc oxide, ortho di-substituted phenols, hydroxyphenyl propionates, hydroxybenzyl compounds, aromatic amines, sterically hindered amines, phosphites and organic sulphur compounds such as thiobisphenols and thioethers. Preferably, the compound is selected for suitability for the containment application, compatibility with latex and cost as well as the transport properties to the sealing site.

Meeting these requirements, carbon black is preferably included as a radiation stabiliser, preferably being present in the latex in proportion of less than 1 wt % of the sealing composition, for example 0.6 wt %, and at the requisite particle size as indicated above. Carbon black may be available as a furnace black or a special black. Furnace blacks are a relatively low cost commodity chemical typically produced from heating heavy residual oil in the absence of oxygen.

In one example, prior to injection—as described below— approximately 1260 kg (6-210 Kg drums) of latex containing a small amount of coconut oil (sufficient to achieve a lauric acid concentration of about 0.03 wt % in the final sealing composition) was mixed with an additive mixture comprising 2.5 kg of KT powder (coagulation inhibitor), ground to the required sizing, 1-5 kg of KOH and about 8 kg of carbon black. Required quantities of sealing composition for the sealing application will be determined following measurement of the hydraulic parameters as mentioned above. As the hydraulic parameters are monitored using a computer control and data acquisition unit, quantities may be re-calculated and further sealing composition made available as required. A suitable control and data acquisition unit is described in U.S. Pat. No. 6,801,814, the contents of which are hereby incorporated herein by reference.

The sealing composition is pumped to provide gas/liquid containment barriers 130, 230, 330 about tanks 114. While the Applicant has used pumping at pressures up to 20 MPa in rock formations to enable sealing of large cracks, such pressures are not required for forming containment barriers 130, 230, 330 in waste treatment facility 110. Injection of sealing composition at pressures less than 1 MPa, for example about 0.6 MPa may be sufficient.

Coagulation or setting of the sealing composition may be done in a number of ways using coagulation accelerators and curing agents for example as described in the Applicant's Australian Patent Nos. 2009253842 and 2013266018 incorporated herein by reference. Acids provide a convenient example. Shear may also cause coagulation or setting though is unlikely to be sufficient alone.

Radiation Resistance

Samples of a sealing composition or grout, containing carbon black anti-rad as described above, were subjected to irradiation by a $^{60}$Co source at doses of 1 MRad, 10 MRad and 100 MRad. An un-irradiated control was also included.

As to qualititative observations, the un-irradiated sample had an acetate smell. An unpleasant acrid odour arose from the more highly irradiated samples. A slight oily film developed with increasing radiation dose. Samples became stiffer with increasing radiation dose. Rippling of sample grouts was observed at 1 MRad through 100 MRad where erosion was encountered.

No significant dimensional changes occurred for the sample grouts with irradiation as evident from the following Table.

| Dose | Dimensional Stability |
|---|---|
| 0 | 0.89 |
| 1 MRad | 1.05 |
| 10 MRad | 1.02 |
| 100 MRad | 0.95 |

However, there was a significant increase in density from 0 MRad to 1 MRad, consistent with increased cross-linking. Density decreased over the range 10 to 100 MRad consistently with increased chain scission. Low levels of radiation may even be effectively curative, inducing a requisite degree of cross-linking and setting in the grout and increasing seal effectiveness.

Irradiation, particularly above 1 MRad, made the samples more elastic, even hyperelastic, and less plastic. Sample grouts ruptured at 800% elongation at 1 MRad irradiation, falling to a still acceptable 200% elongation at 100 MRad irradiation. However, erosion channeling presents some issues at this radiation level.

The tests indicate that sample grouts would form effective sealing compositions and containment barriers even up to 100 MRad irradiation and compare favourably with studies showing significant changes in properties of poly(ether-block-amide) thermoplastic elastomers in the 5 to 20 MRad dose range and substantial loss of mechanical properties of vulcanized chlorobutyl rubbers at 2.5 MRad.

Toxicity Analysis

Toxicity analysis was conducted to assess compliance with US regulatory levels for a number of contaminants as regulated by SW-846, Method 1311: Toxicity Characteristic Leaching Procedure (TCLP), herein incorporated by reference. TCLP organic results for the sample grouts showed no detectable amounts of regulated VOC, SVOC or commonly used organochlorine pesticides. TCLP results for As, Cd, Cr, Pb, Hg, Se and Ag were all below regulatory limits and below detectable limits. The sample grouts were TCLP compliant.

Modifications and variations to the sealing method and composition as described herein and as would be apparent to the skilled addressee are deemed to be within the scope of this invention.

The invention claimed is:

1. A method of limiting or reducing liquid and/or gas inflow through a porous matrix, comprising delivering to said porous matrix a coagulable polymer emulsion or colloid comprising a dispersion of polymer particles for contacting with at least one selected additive which interacts with said polymer emulsion or colloid to form a sealing barrier to reduce liquid and/or gas inflow through the porous matrix wherein said coagulable polymer emulsion or colloid contains at least one selected additive including one or a combination of radiation stabilisers to confer radiation resistance on said sealing barrier; wherein said sealing barrier is formed by contacting said polymer emulsion or colloid with a further selected additive to cause coagulation of said polymer emulsion or colloid to a coagulated mass to form said sealing barrier; wherein said sealing composition comprises a latex emulsion or colloid comprising a dispersion of latex particles in aqueous solution and a radiation stabiliser selected from the group consisting of carbon black, zinc oxide both in particulate form and essentially insoluble in water; ortho di-substituted phenols, hydroxyphenyl propionates, hydroxybenzyl compounds, aromatic amines, sterically hindered amines, phosphites and organic sulphur compounds; and wherein said sealing composition forms a containment barrier mechanically resistant to at least 1 MRad.

2. The method of claim 1, wherein said sealing composition is introduced to said porous matrix by injection through injection holes drilled in the matrix.

3. The method of claim 2, wherein said injection holes are drilled by push drilling.

4. The method of claim 3, wherein said injection holes are drilled and sealing composition injected to form a cylindrical containment barrier for radioactive waste.

5. The method of claim 3, wherein said injection holes are drilled and sealing composition injected to form a conical containment barrier for radioactive waste.

6. The method of claim 3, wherein said injection holes are drilled and sealing composition injected to form a rectilinear containment barrier for radioactive waste.

7. The method of claim 1, wherein said sealing composition contains carbon black as radiation stabiliser.

8. The method of claim 1, wherein said containment barrier is mechanically resistant to at least 10 MRad.

9. The method of claim 1, wherein said containment barrier is mechanically resistant to up to 100 MRad.

10. A method of limiting or reducing liquid and/or gas inflow through a porous matrix, comprising delivering to said porous matrix a coagulable polymer emulsion or colloid comprising a dispersion of polymer particles for contacting with at least one selected additive which interacts with said polymer emulsion or colloid to form a sealing barrier to reduce liquid and/or gas inflow through the porous matrix wherein said coagulable polymer emulsion or colloid contains at least one selected additive including one or a combination of radiation stabilisers to confer radiation resistance on said sealing barrier; wherein said sealing barrier is formed by contacting said polymer emulsion or colloid with a further selected additive to cause coagulation of said polymer emulsion or colloid to a coagulated mass to sealing barrier; wherein said form said containment barrier is mechanically resistant to at least 10 MRad.

11. The method of claim 10, wherein said containment barrier is mechanically resistant to at least 100 MRad.

* * * * *